US007421586B2

(12) United States Patent
Luo et al.

(10) Patent No.: US 7,421,586 B2
(45) Date of Patent: Sep. 2, 2008

(54) PROTECTING MOBILE CODE AGAINST MALICIOUS HOSTS

(75) Inventors: Chenghui Luo, Warwick, RI (US); Jian Zhao, Rumford, RI (US)

(73) Assignee: Fraunhofer Gesselschaft (DE)

( * ) Notice: Subject to any disclaimer, the term of this patent is extended or adjusted under 35 U.S.C. 154(b) by 901 days.

(21) Appl. No.: 10/654,826

(22) Filed: Sep. 4, 2003

(65) Prior Publication Data

US 2004/0172544 A1 Sep. 2, 2004

Related U.S. Application Data

(63) Continuation-in-part of application No. PCT/US00/13117, filed on May 12, 2000, which is a continuation-in-part of application No. PCT/US00/13128, filed on May 12, 2000.

(60) Provisional application No. 60/133,840, filed on May 12, 1999, provisional application No. 60/133,848, filed on May 12, 1999, provisional application No. 60/407,929, filed on Sep. 4, 2002.

(51) Int. Cl.
*H04L 9/00* (2006.01)
*G06F 12/14* (2006.01)

(52) U.S. Cl. .................... 713/187; 713/189; 713/193; 713/194; 713/167; 713/164; 707/108; 707/118; 707/137; 707/147

(58) Field of Classification Search .................. 713/187
See application file for complete search history.

(56) References Cited

U.S. PATENT DOCUMENTS 4,764,959 A 8/1988 Watanabe et al.

(Continued)

FOREIGN PATENT DOCUMENTS

WO WO 97/04394 2/1997

(Continued)

OTHER PUBLICATIONS

Low, D., 'Java Control Flow Obfuscation', Univ. of Auckland, Jun. 3, 1998, entire document, http://www.cs.auckland.ac.nz/research/theses/1998/low_douglas_thesis1998.pdf.*

(Continued)

*Primary Examiner*—Kristine Kincaid
*Assistant Examiner*—Ronald Baum
(74) *Attorney, Agent, or Firm*—Gordon E. Nelson

(57) ABSTRACT

Techniques for using a class loader to protect mobile code against a malicious host. The techniques include using the class loader to extend a class used by the mobile code such that a method is added to the code which authenticates the mobile code. When executed, the method provides a dynamic watermark that authenticates the code. The method may be encrypted until it is added to the code. One such method uses a static watermark in the code to determine whether the code has been modified.

The techniques also include using a class loader to extend the class such that obfuscated symbolic names in the program that correspond to symbolic names defined by the class can be resolved. A way of doing this is to include a first association between the obfuscated symbolic names and encrypted forms of the corresponding symbolic names in the program and to make a second association between the encrypted forms of the corresponding symbolic names and information used to resolve the symbolic names defined in the class. The loader then uses the first and second associations to resolve the obfuscated names.

The class extension techniques may be combined with obfuscation of names defined in the program and static watermarking to provide layered protection of the mobile code. The obfuscation and definition of the first association are done prior to execution of the program and the class extension is done on execution of the program. The disclosed techniques are particularly well-adapted for use with the byte codes produced by Java language compilers from Java language programs.

17 Claims, 16 Drawing Sheets

U.S. PATENT DOCUMENTS

| | | |
|---|---|---|
| 5,287,407 A | 2/1994 | Holmes |
| 5,287,408 A | 2/1994 | Samson |
| 5,530,752 A | 6/1996 | Rubin |
| 5,559,884 A | 9/1996 | Davidson et al. |
| 5,613,004 A | 3/1997 | Copperman et al. |
| 5,692,047 A | 11/1997 | McManis |
| 5,745,569 A | 4/1998 | Moskowitz et al. |
| 5,892,899 A | 4/1999 | Aucsmith et al. |
| 6,006,328 A | 12/1999 | Drake |
| 6,102,966 A | 8/2000 | Tyma |
| 6,591,415 B1 | 7/2003 | Torrubia-Saez |
| 6,668,325 B1 | 12/2003 | Collberg et al. |

FOREIGN PATENT DOCUMENTS

| | | |
|---|---|---|
| WO | WO 99/01815 | 1/1999 |
| WO | WO 99/13613 | 3/1999 |
| WO | WO 00/72112 A3 | 11/2000 |

OTHER PUBLICATIONS

Collberg & Thomborson, "Software Watermarking: Models and Dynamic Embeddings", Department of Computer Science The Univ. of Auckland, Private Bag 92019, Auckland, NZ.

Collberg, Thomborson & Low, "A Taxonomy of Obfuscating Transformations", Technical Report #148, Department of Computer Science The Univ. of Auckland, Private 92019, Auckland NZ.

A, Monden, H. Ilda, K. Matsumoto, K. Inoue, and K. Torii, "A Practical Method for Watermarking Java Programs", In compsac2000, pp. 194-195.

A Monden, H. Ilda, K. Matusmoto, K. Inoue, and K. Torii, "Watermarking Java Programs," in Proc. 4th International Symposium on Future Software Technology (ISFST' 99), pp. 119-124.

* cited by examiner

```
                        202
import java.util.Date;
                      203
public class Person {       205
    private String name;
    private Date dob; // date of birth
                         207
    public Person(String n, Date d) // constructor
    {
        name = n;
        dob = d;         209          211
    }
    public void changeName(String newName)
    {
        name = newName;
    }
}
```

```
import java.util.Date;
import java.util.Vector;   303 public class Person {
      private Vector v = new Vector();   304
      public Person(String n, Date d) // constructor
      {
            v.addElement(n);    ⎤
            v.addElement(d);    ⎦  305
      }
      public void changeName(String newName)
      {
            String s = (String)v.elementAt(0);   307
            s = newName;
            v.setElementAt(s, 0);   309
      }
}
```

301

```
import java.util.Date;
import java.util.Vector;

public class P {   311
      private Vector v = new Vector();
      public P(String n, Date d) // constructor
      {
            v.addElement(n);
            v.addElement(d);
      }
      public void c(String n)   313
      {
            String s = (String)v.elementAt(0);
            s = n;   315
            v.setElementAt(s, 0);
      }
}
```

```
public class P {          403
    private V v = new       405
    public P(S n, D d)  // constructor
    {
        v.a(n);
                              407
        v.a(d);
    }                         411
    public void c(S n)
    {                          413
        S s = (S)v.b(0);
        s = n;
        v.c(s, 0);
    }                         415
}

401
```

```
java.lang.String      S
java.util.Date        D
java.util.Vector      V
```

```
Person p = new Person("John Doe", new Date());
p.changeName("John Hancock");
```

501

```
Class c = p.getClass();   505
Method[] m = c.getMethods();   507
String[] a = {"John Hancock"};   509
m[1].invoke(p, a);   // same as p.changeName("John Hancock")   511
```

```
private void add()
0:      iconst_0
1:      istore_2
2:      iconst_1
3:      istore_1
4:      goto            #14
7:      iload_2
8:      iload_1
9:      iadd
10:     istore_2
11:     iinc            %1    1
14:     iload_1
15:     bipush          100
17:     if_icmple       #7
20:     getstatic       java.lang.System.out
                        Ljava/io/PrintStream; (48)
23:     nop
24:     new             <java.lang.StringBuffer> (32)
27:     dup
28:     ldc             "1 + 2 + ... + 100 = " (3)
30:     nop
31:     invokespecial   java.lang.StringBuffer.<init>
                        (Ljava/lang/String;)V (38)
34:     iload_2
35:     invokevirtual   java.lang.StringBuffer.append
                        (I)Ljava/lang/StringBuffer; (40)
38:     ldc             " " (1)
40:     nop
41:     invokevirtual   java.lang.StringBuffer.append
                        (Ljava/lang/String;)Ljava/lang/StringBuffer; (41)
44:     invokevirtual   java.lang.StringBuffer.toString
                        ()Ljava/lang/String; (52)
47:     invokevirtual   java.io.PrintStream.println
                        (Ljava/lang/String;)V (49)
50:     return
```

803(a) — line 23
803(b) — line 31
803(c) — line 40

```
12 putfield #250 <Field java.util.Vector nextSites>
15 aload_0
16 ldc #48 <String "Failed: ">
18 putfield #210 <Field java.lang.String failures>
21 aload_0
22 aload_1
23 putfield #291 <Field DWASuitCase suitcase>
26 aload_0
27 aload_1
28 iconst_4
29 invokevirtual #217 <Method java.lang.Object get(int)>
32 checkcast #119 <Class DWAPolicy>
35 putfield #255 <Field DWAPolicy policy>
38 aload_0
39 aload_1
40 iconst_5
41 invokevirtual #217 <Method java.lang.Object get(int)>
44 checkcast #124 <Class DWASiteInfo>
47 putfield #286 <Field DWASiteInfo siteInfo>
```

PROTECTING MOBILE CODE AGAINST MALICIOUS HOSTS

CROSS REFERENCES TO RELATED APPLICATIONS

The present patent application is a continuation-in-part of the following patent applications:

PCT/US00/13117, J. Zhao and C. Luo, Authenticating executable code and executions thereof, filed May 12, 2000 and claiming priority from the U.S. Provisional patent applications 60/133,840, J. Zhao, Watermarking mobile code to detect and deter malicious hosts and 60/133,848, J. Zhao, Watermarking Java software for copyright protection, both filed May 12, 1999. PCT/US00/13117 entered the US national stage on May 21, 2002 as U.S. Ser. No. 10/019,827 and is still in prosecution.

PCT/US00/13128, C. Luo and J. Zhao, Obfuscation of executable code, filed May 12, 2000 and claiming priority from the above U.S. Provisional patent applications 60/133,840 and 60/133,848. PCT/US00/13128 entered the US national stage on May 21, 2002 as U.S. Ser. No. 10/019,828 and is still in prosecution.

The present patent application claims priority from 60/133,840, 60/133,848, PCT/US00/13117, PCT/US00/13128, and U.S. provisional patent application 60/407,929, C. Luo, Multi-layer protection of mobile code, filed Sep. 4, 2002. U.S. Ser. Nos. 10/019,827 and 10/019,827 are further incorporated by reference herein for all purposes.

The present patent application contains portions of the disclosures of its parents. The new material in the Detailed Description begins with the section Multi-layer protection of mobile code.

BACKGROUND OF THE INVENTION

1. Field of the Invention

The invention relates generally to techniques which protect code that is executable in a computer system from reverse engineering and/or modification. The invention relates more particularly to the use of obfuscation and watermarking to protect code that executes in an execution environment such as that provided by the Java platform.

2. Description of Related Art

As more and more of the devices attached to networks have become programmable, mobile code has become more and more important. Mobile code is code which is downloaded to a device attached to a network in the course of an interaction between a user of the device and the network (or another device attached to the network) and is then executed as part of the interaction. Mobile code is ubiquitous in the Internet. Many Web pages include mobile code written in the Java™ or ActiveX programming languages. When the Web page is received in a browser, the mobile code is executed by the computer upon which the browser is running. Mobile code is also used to implement features in devices such as cellular telephones. When a user does something with the cellular telephone which requires the feature, mobile code for the feature is downloaded to the cellular telephone and then used in the interactions that involve the feature.

From the point of view of the provider of a piece of mobile code, the very mobility of the code is a problem. In order to be useful, the code must be downloaded to the user; once it has been downloaded, it is available to the user not only for use, but also for illegitimate purposes such as copying, reverse engineering, and modification, including modification for the purpose of altering the interaction for which the code was downloaded. As modified, the code may permit the user to avoid paying a fee, to access restricted information, or to sabotage a network switch, to name just a few possibilities. Widely-available software tools such as decompilers (programs which produce a high-level language version of a program, for example, a source code version, from an object code version), disassemblers (programs which produce an assembly-language program from an object code version), or debuggers (programs which permit a user to observe and manipulate another program as the other program executes) make it relatively easy for the skilled user to study and modify the mobile code.

What has just been described is an example of the malicious host problem. The host is the processor upon which the downloaded mobile code executes; a host is malicious when it makes illegitimate use of the mobile code. The parents of the present patent application deal with two techniques for protecting mobile code from malicious hosts:

obfuscation, in which code is rewritten in a form which does not substantially affect the manner in which the code executes, but makes it more difficult to study, decompile, or disassemble the program.

watermarking, in which information is hidden in the code which does not affect how the code executes, but makes it possible to detect whether the code has been altered.

In the parent applications, obfuscation and watermarking techniques are applied to code written in the Java programming language, developed by Sun Microsystems, Inc. and described in detail in Ken Arnold, et al., *The Java Programming Language*, Addison-Wesley Publishing Company, Reading, Mass., 1997. Programs written in the Java programming language are intended to be used in an infrastructure 101 of the type shown in FIG. 1. Writing a Java language program involves the portions of the infrastructure shown at 103 through 107. Java source code 103 is the Java language code as written by the programmer; Java compiler 105 is a program which generates Java byte code 107 from Java source code 103. Java byte code 107 is executable on any programmable device which includes a Java virtual machine. For a general discussion of the Java virtual machine, see Tim Lindholm and Frank Yellin, *The Java Virtual Machine Specification*, Addison-Wesley Publishing Company, Reading, Mass., 1999

Such a programmable device is shown at 111. Device 111 has two main hardware components, processor 113, which executes machine instructions 117, and memory 114, in which programs and data are stored. Included in the programs is Java virtual machine 115, which interprets the byte codes in Java byte code 107 to produce machine instructions 117. Programmable device 111 is connected to network 109 and Java byte code 107 is a mobile program which has been downloaded via network 109 from a server (not shown) upon which it was stored. As indicated above, byte code 107 may be a part of an HTML page being interpreted by a Web browser.

In interpreting Java byte code 107, Java virtual machine 115 must interpret Java byte code 107's names. Some of the names in byte code 107 are defined by the Java infrastructure; others are defined in byte code 107. In the Java programming language, names are defined in class definitions; Java virtual machine 115 has access to two sets of class definitions: Java system classes 119, which are class definitions that are available to the Java virtual machine from sources other than byte code 107, and application classes 121, which are classes defined in byte code 107. Application classes 121, like the other data used in the execution of Java byte code 107, are stored in application runtime 123, an area private to the execution of Java byte code 107. The use of application runtime 123 ensures that an execution of byte code 107 will neither affect nor be affected by the execution of other Java byte codes. Moreover, application runtime 123 can be defined in a manner which limits the amount of control that a byte code 107 may exercise over programmable device 111, and can thereby protect programmable device 111 from mistakes in byte code 107 or malicious byte codes.

The popularity of the Java programming language for mobile code is a result of the advantages offered by Java infrastructure 101. Because Java byte codes can be executed on any device with a Java virtual machine, Java byte codes are completely portable. Because application runtime 123 offers a protected execution environment for the byte codes, the byte codes may be safely executed on any of these devices. Infrastructure 101 does, however, have a significant disadvantage: Java byte codes are more difficult to protect against study and reverse engineering than other executable programs.

One reason for this is that a Java byte code and a Java virtual machine together contain far more information about the program than is available in the object code generally produced by compilers. Together, Java system classes 119 in the Java virtual machine and application classes 121 for a given Java byte code contain all of the information needed to define the symbolic names used in the Java byte code. Symbolic names include class, method, and field names. Some of the symbolic names are defined by the programmer for the particular application program and others are defined as part of the Java infrastructure. The latter names are termed herein Java system names. Because the definitions for all of the names used in the byte code are contained either in the byte code itself or in the Java virtual machine, a programmer who is studying the byte code can use the Java reflection mechanism or a Java debugger to find out the complete class information for a particular program construct in the byte code.

Obfuscation of Java Byte Code

The possibilities for obfuscating Java byte code are limited. Application-defined names in Java byte code can of course be obfuscated in the same fashion as in any other computer code. However, when Java virtual machine 115 executes a Java byte code, it links the java system names in the byte code to the definitions 119 of those classes in programmable device 111. The linking is done by matching the names in the byte code with names in the definitions 119. Consequently, the Java system names cannot be obfuscated in the byte code. If they are obfuscated, virtual machine 115 cannot find the definitions in system classes 119 and if it cannot do that, it cannot execute the byte code. A parent of the present patent application, U.S. Ser. No. 10/019,828, presents techniques for obfuscating Java system names in Java byte codes and executing the byte codes with the obfuscated system names.

Watermarking Java Byte Code

A digital watermark is a message which has been incorporated into the content of a digital representation in such a way that the message does not render the digital representation unfit for its intended purpose. Typically, the watermark adds an imperceptible amount of noise to the digital representation. Digital watermarks are used for a number of purposes; the one that is of interest here is to determine whether alterations were made to the digital content after the watermark was added. The alterations necessarily also alter the watermark, and consequently, to determine whether alterations were made, one simply compares the original watermark with the watermark currently in the digital representation. The difficulty with applying standard digital watermarking techniques to mobile code is that mobile code is executable code; that is, everything in it is functional. There is thus no "noise" to hide the watermark in and adding "noise" changes the behavior of the program.

Techniques have nevertheless been developed for using watermarks to authenticate executable code. These techniques have fallen into two broad classes: static watermarking and dynamic watermarking. In static watermarking, the watermark can be perceived from the text of the code; for example, IBM researchers used the order in which the code pushed and popped certain registers as a watermark, as disclosed in: Counsel for IBM Corporation. Software birthmarks. Talk to BCS Technology of Software Protection Special Interest Group. Microsoft researchers encoded a software serial number in the program's control flow graph, as disclosed in U.S. Pat. No. 5,559,884, Robert Davidson and Nathan Myhrvold, Method and system for generating and auditing a signature for a computer program, September 1996. To authenticate a program using such static watermarks, the sender includes an encrypted representation of the correct value of the property being used to watermark the code and the receiver can decrypt the representation and compare it with the value of the property in the code as received.

In dynamic watermarking, the watermark can be perceived from properties of the execution of the code. Published PCT application WO 99/64973, Callberg, et al., Software watermarking techniques, priority date Jun. 10, 1998, describes program watermarking techniques that are based on the program's dynamic response to a given input string.

While these techniques do make it possible to authenticate executable code, they have significant limitations. In the case of the static watermarking techniques described above, the information used for the watermark is an integral part of the executable code, which means that all copies of the executable code will have the same watermark. Moreover, if the property being used as the basis of the watermark is known, a malicious sender need only modify other aspects of the executable code. As long as the property that is the basis of the watermark is untouched, the modified code will appear to the receiver to be authentic.

In the case of the dynamic watermarking, the dynamic response that provides the watermark is produced by adding additional code to the program being watermarked; because the additional code is not necessary for the functioning of the program, it can be removed, and when it is removed, the watermark is gone. Another parent of the present application, U.S. Ser. No. 10/019,827, describes techniques for overcoming these limitations of watermarks in code.

As described in the parents of the present application, obfuscation and watermarking are stand-alone techniques for protecting mobile code against malicious hosts. What is needed, and what is provided by the invention disclosed herein, are better ways of using these techniques to protect mobile code against malicious hosts than heretofore possible. It is thus an object of the present invention to provide better protection for mobile code against malicious hosts.

SUMMARY OF THE INVENTION

In one aspect of the invention, the object is attained by mobile code with obfuscated symbolic names that include obfuscated symbolic names corresponding to system symbolic names. The code further includes an association between the obfuscated symbolic names and encrypted forms of the system symbolic names corresponding to the obfuscated symbolic names. The execution environment uses information from the association to resolve the obfuscated symbolic names. The code may additionally include authentication information from which the execution environment may determine authenticity of the code.

In another aspect of the invention, the object is attained by an improved class loader that loads a class in a program execution environment in a host computer system and is characterized in that the improved class loader includes a component which is employed on execution of a program that specifies entities defined by the class to extend the class such that the program is protected from the host. In one aspect, the component extends the class by adding a method which determines whether the program has been modified by the host. The method may be encrypted and the class loader may decrypt the method on adding the method to the program.

The component may also extend the class by modifying the name resolution done by the program execution environment such that symbolic names in the program that identify entities defined by the class may be replaced by corresponding obfuscated symbolic names. The program may further include a first association between obfuscated symbolic names in the program and encrypted forms of the corresponding symbolic names and the component extends the class by adding a second association between the encrypted forms and information used to resolve the symbolic names defined in the class, the class loader using the first and second associations to resolve the obfuscated symbolic names.

Other objects and advantages will be apparent to those skilled in the arts to which the invention pertains upon perusal of the following Detailed Description and drawing, wherein:

BRIEF DESCRIPTION OF THE DRAWING

FIG. 2 is an example of a class definition in the Java programming language;

FIG. 3 shows first two stages in the obfuscation of the example of FIG. 2;

FIG. 4 shows a third stage in the obfuscation of the example of FIG. 2;

FIG. 5 shows obfuscation of method names;

FIG. 8 is an example of a Java byte code sequence with a watermark;

FIG. 11 is an execution trace of an execution of a Java byte code;

Figure 1:
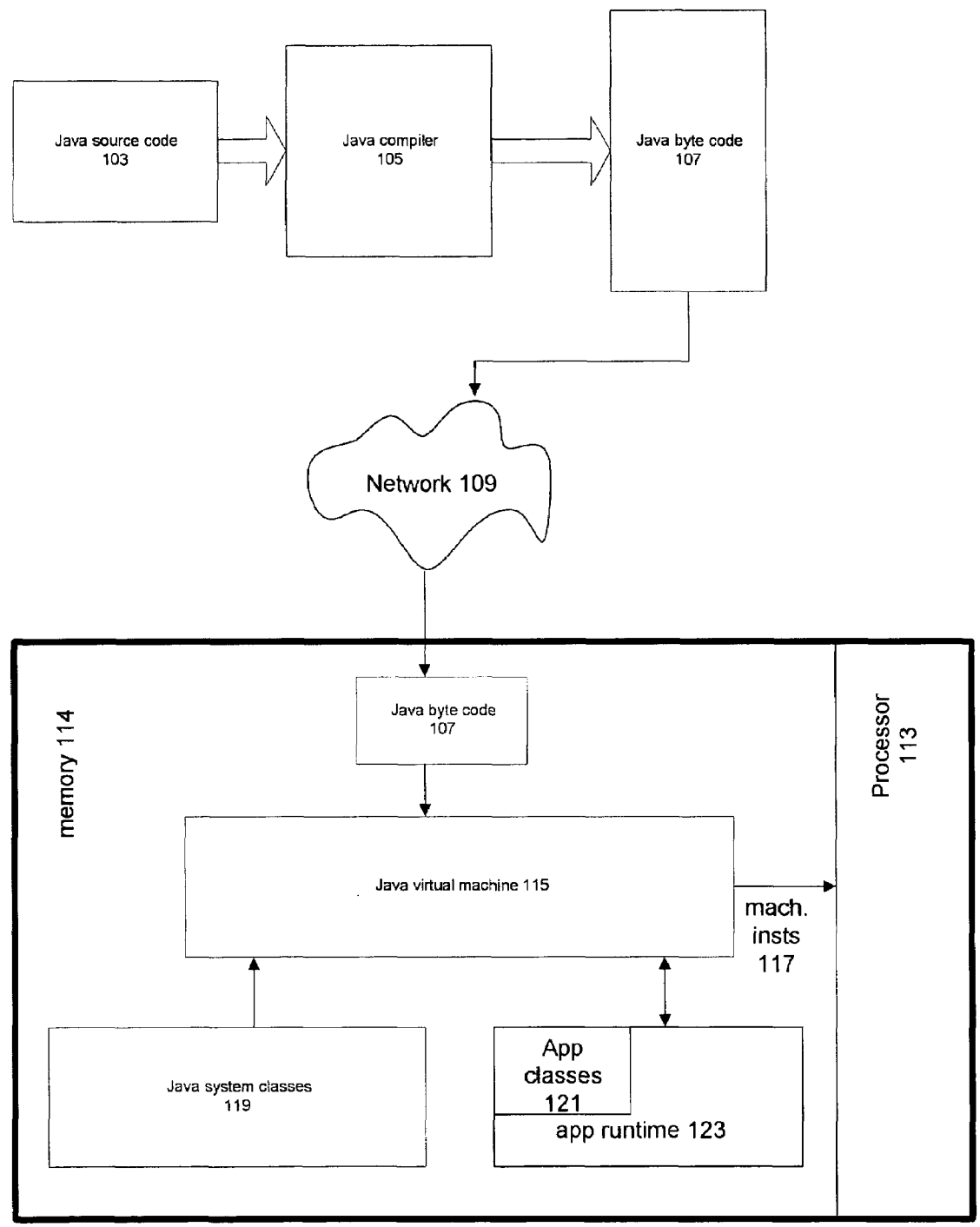
FIG. 1 is a block diagram of a prior-art infrastructure for programs written in the Java programming language.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first present the description of obfuscation techniques from U.S. Ser. No. 10/019,828 and then the description of code watermarking techniques from U.S. Ser. No. 10/019,827 and will finally describe how these techniques can be combined to provide multi-layer protection of mobile code against malicious hosts.

Obfuscation Techniques for Mobile Code

The following Detailed Description will first present two new techniques for code obfuscation generally and will then present techniques which employ encryption for obfuscation and thereby overcome the problems which Java system-defined symbolic names or other "well-known" names pose for obfuscation.

Data Field Obfuscation: FIGS. 2-4

FIG. 2 shows a class definition 201 in the Java language as it might be written in Java source code. The following discussion shows how all of the symbolic names in the class definition may be obfuscated by replacing them with less-informative names. Though the techniques in the example are being applied to the class definition in the source code, they may be equally applied to the class definition in the Java byte code.

Class definition 201 defines a class Person of objects. Objects of the class contain two items of personal data, namely a person's name (name) and his or her date of birth (dob), and two methods are defined for objects of the class: namely, a constructor that constructs an object of the class given a name and a date of birth and a changeName method that changes the name information in the object. The programmer who wrote definition 201 has used meaningful names throughout, and consequently, class definition 201 is easy to understand. It should further be pointed out here that import java.util.Date 202 makes a Java system class available for use in class definition 201.

The first stage of the obfuscation is shown in FIG. 3. The first stage 301 uses a new obfuscation technique termed herein data field obfuscation, because it obfuscates the names and types of the fields 205 and 207 that contain the data for an object of the class. The technique works by replacing the data fields with elements of a Java system array class, Vector. The import statement for the class is at 303. For purposes of obfuscation, Vector has the important property that the elements of a Vector object may have different classes, so that Vector hides not only name information, but also class information. At 304, the class definition for Person now specifies that a new object of class Vector be created; its elements will be objects that contain the values of the data fields. The constructor now uses the addElement method of Vector at 305 to add elements to the vector object that contain the object's data fields and to set them to the person's name and date of birth. changeName now takes the first element of the Vector object v (307) as an argument (obtained using the elementAT method of Vector), and the name is given a new value using the setElementAt method of Vector (309). One can now no longer tell from looking at the class declaration for Person that the data stored in objects of the class is the name and date of birth of a person.

Obfuscation continues at 310 using techniques of the type explained in the Collberg reference. At 311, the class name Person is obfuscated by replacing it with the much-less informative P; that of course also obfuscates the name of the constructor. Similarly, changeName is replaced with c at 313 and newName with n at 315. Of course, the replacement names are arbitrary and could be made even more meaningless; for example, they could be simply randomly-generated strings of the characters that are legal in names in the Java language.

FIG. 4, finally, shows how the Java system symbolic names String, Date, and Vector and the symbolic names of the addElement, elementAt, and setelementAt methods can be obfuscated. At 401 is shown the class definition of FIGS. 2 and 3 with this final degree of obfuscation: Vector has been replaced by v (403), Date has been replaced by D (407), and String by S (405). The three method names addElement, elementAt, and setElementAt have been replaced by a 411, b 413, and c 415. This is possible because the Java language permits renaming of previously-defined entities, including system-defined symbolic names. One way of doing the renaming in the Java language is shown at 409.

The only difficulty with the foregoing complete obfuscation of the symbolic names defined in the Java system classes is that the renaming of the system class names shown at 409 is included in the Java byte code produced by compiler 105 and is thus available to the user who wants to study the Java byte code. A technique that uses encryption to deal with this problem will be described later.

Method Name Obfuscation: FIG. 5

For a skilled reader of code, relationships between names in the code can be determined from the ways the names are used. An example of this is shown at 501 in FIG. 5. The first line of Java language code shown there creates a new object p of class Person; the next line applies the changeName method of the class to the new object p. Even if the names of the class and the method are obfuscated using the techniques described in the foregoing, it will still be apparent to the skilled reader that the first line of the code creates a new object of the class specified in the first line and that the second line applies a method of the class to the new object.

Such relationships can be obfuscated by using the Java language's reflection mechanism. Because the class information for a Java byte code is available to the Java virtual machine, the Java system classes include methods for returning class information about Java objects. One such method is shown at 505; in the Java language, classes are themselves Java objects, and every Java object is associated with one or more class objects that contain the information about the Java object's class. It thus possible to do what is done at 505: the getClass method of the Java system class Class is applied to the object p and the resulting class information is stored in the Class object c. The class information of course includes the class's methods, and thus it is also possible to do what is done at line 507: the getMethods method of Class is applied to the object c and a list of the methods of the class currently represented by c is assigned to an object m of the array class Method. Finally, the methods themselves are objects that belong to a class, and one of the methods for that class is invoke, which, when applied to an object of the method class, causes the method to be invoked, as shown at 511.

Since one can use the methods of the reflection mechanism to determine an object's class, locate a method of the class, and invoke the method, one can use the methods of the reflection mechanism to perform the operation shown at 501 and thereby add an additional level of obfuscation to the code of 501. The Java code of 503 assumes that an object p exists; in line 505, getclass is used to get p's class information; in line 507, getMethods is used to get the methods that apply to p from the class information; at line 509, a new value for the name is assigned to a string object a, and at 511, the invoke method is used to invoke the method used with the object p to change the value of the name in the object. Thus, as set forth in the comment (which of course would not be in the byte code), m [1]. invoke (p, a); is exactly equivalent to p. changeName ("John Hancock"); but much more difficult for the reader to analyze.

It should be pointed out here that obfuscation generally is carried out by a computer program that is applied to the byte code produced by a Java compiler. Conceptually, what such an obfuscation program does is first make a table which contains the names in the byte code that are to be replaced by new names and the names that are to replace the original names and then rewrite the byte code using the replacement names. The obfuscation may be done more than once; for example, the obfuscation program might first do the obfuscation shown in FIGS. 2-4 and then apply the techniques of FIG. 5 to the results of that obfuscation. Obfuscation can even be used to decrease the size of Java byte codes. This is done by using techniques such as Huffman encoding to minimize the size of the names used to obfuscate the original names. Finally, while the obfuscation techniques described above are particularly useful when applied to Java byte codes, they may be applied to any computer program that includes symbolic information such as names. Moreover, while the protection afforded by obfuscation is particularly valuable for mobile code, it may be applied to any kind of code. The obfuscation may be applied to a whole software package after it is developed, or it can be integrated into a compiler to incrementally obfuscate symbolic names as compilations are performed during program development.

Figure 6:
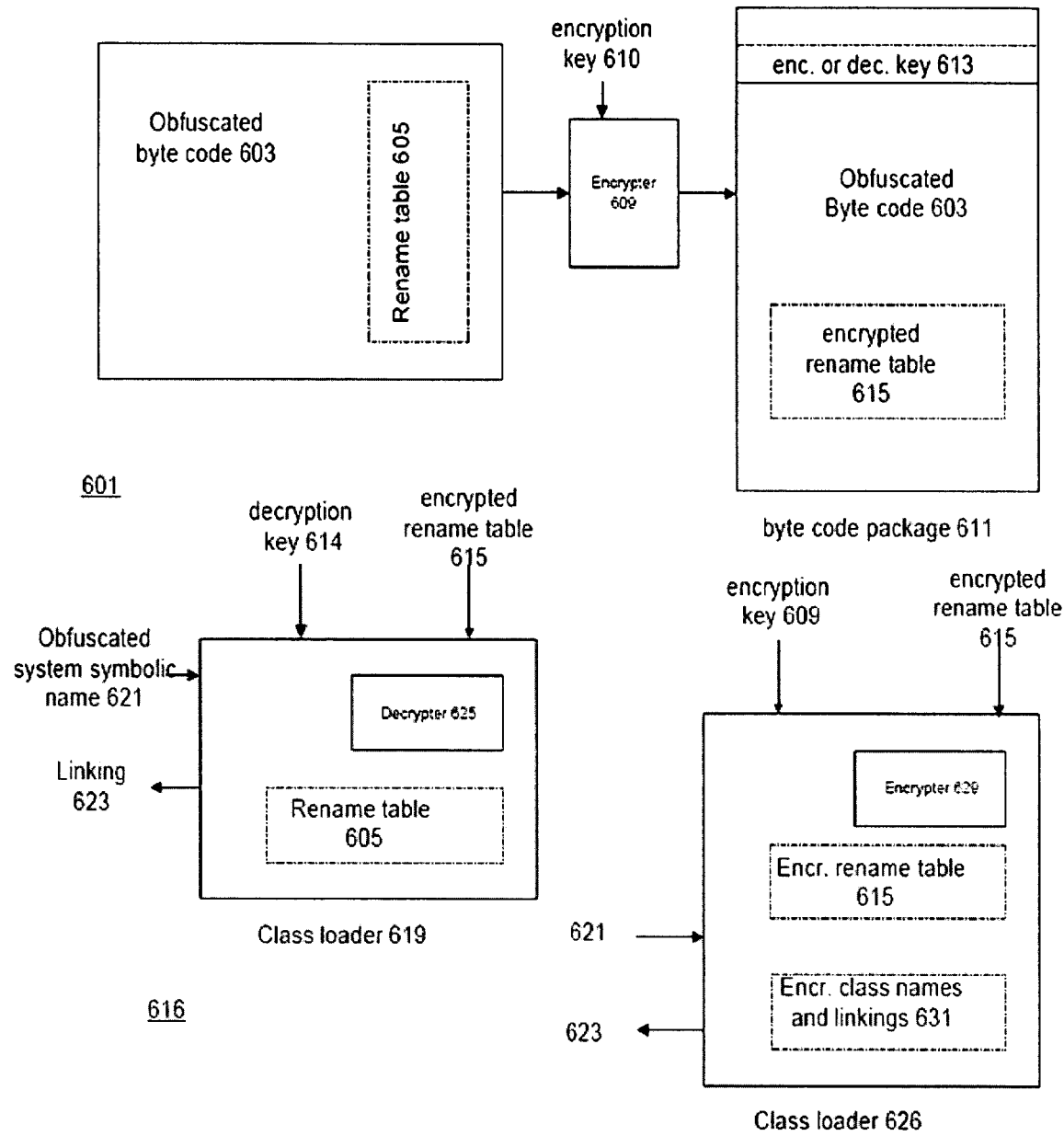
FIG. 6 shows techniques for using encryption to obfuscate system names.

Using Encryption to Obfuscate Java System Class Information: FIG. 6

The Java virtual machine interprets symbolic names as it encounters them in the byte code it is interpreting. If the class information that defines a symbolic name is not already available to the Java virtual machine, a component of the virtual machine called the class loader loads the class information. Class loaders are objects of the system class ClassLoader and have a method loadclass which specifies how class information is loaded and interpreted. Java virtual machines include a default class loader, but Java language programmers may define their own class loaders.

Encryption techniques may be used in Java byte code and Java class loaders to obfuscate symbolic names in the byte code that are defined in Java system classes. The techniques are shown in FIG. 6. At 601 is shown how the information 409 required to relate obfuscated system symbolic names to the original system symbolic names may be encrypted. Obfuscated byte code 603 includes a rename table 604 which relates the obfuscated system symbolic names to the original system symbolic names. Obfuscated byte code 603 is then run through an encrypter 609 which uses any of a number of standard encryption methods to encrypt at least the original system symbolic names in rename table 605. The encryption is done using encryption key 610. The result of the encryption is byte code package 611, which includes obfuscated byte code 603, the encrypted version 615 of rename table 604, and a key 613. As will be explained in detail later, key 613 may be either encryption key 609 or a decryption key that will decrypt encrypted rename table 615. In the following, structures such as rename table 604 that associate items of information with each other are termed associations.

At 617 and 625 are shown two versions of a class loader that can use encrypted rename table 615 to link the obfuscated system symbolic names to the Java virtual machine's definitions for the names. Beginning with class loader 619 of version 617, class loader 619 is able to receive an obfuscated system symbolic name 621 and return the linking 623 which relates obfuscated system symbolic name 621 to the definition for the original system symbolic name. In order to do this, when system class loader 619 initializes itself for the execution of obfuscated byte code 603, it retrieves encrypted rename table 615 and key 613 from byte code package 611. In this case, key 613 is a decryption key 614. System class loader 619 then uses decrypter 625 to decrypt encrypted rename table 615, and thereby to obtain original rename table 605. System class loader 619 then uses original rename table 605 to relate obfuscated system symbolic name 621 to the original symbolic name and thereby to retrieve linking information 623 for obfuscated system symbolic name 621.

Class loader 627 of version 625 is functionally equivalent to class loader 619, but the way it deals with encrypted rename table 615 is different. When system class loader 619 initializes itself, it retrieves encrypted rename table 615 and key 613 from byte code package 611. In this version, key 613 is the key 609 that was used to encrypt encrypted rename table 615. Then, instead of decrypting rename table 615, system class loader 619 uses key 609 to encrypt the system symbolic names used in the Java virtual machine. It then makes an association of the the encrypted system symbolic names with their definitions, and uses these encrypted symbolic names and linkings 631 together with encrypted rename table 615 to link obfuscated system symbolic names 621 to their system class definitions. When class loader 627 receives an obfuscated symbolic name 621, it looks up the obfuscated symbolic name in encrypted rename table 615 and then applies the encrypted symbolic name corresponding to the obfuscated symbolic name to encrypted symbolic name and linking information 631 to obtain the linking information 623 corresponding to the obfuscated symbolic name. There are two advantages of version 625 over version 617: first, the key in version 625 cannot be used to decrypt encrypted rename table in byte code package 611. Second, class loader 627 never contains a decrypted version of encrypted rename table 615.

Keys 613 may be handled in any of the ways generally used to protect keys and encrypted contents. If key 613 is included in byte code package 611 and is a decryption key 614, it must itself be protected, for example, by encrypting it in such a way that only someone who has legitimately received a copy of byte code package 611 can decrypt it. If package 611 is mobile code for a hardware device such as a cellular telephone or a cable TV set-top box, the key can be built into the hardware device and need not be provided in the package at all. If package 611 is downloaded as part of a transaction on the Internet, the key can be provided from a key server after the transaction has been approved. Different keys can of course be used for individual users and/or individual copies of the software.

In the foregoing, obfuscation using encryption has been employed to obfuscate symbolic names defined by the Java infrastructure. These Java system symbolic names are only one example of "well-known" symbolic names, and obfuscation using encryption can be used with any such symbolic names. Other examples of such "well-known" symbolic names are those defined in application libraries such as the ones used to implement APIs (application programmer interfaces). Indeed, since obfuscation by encryption requires only an encrypter or decrypter and a table which relates encrypted program elements to their unencrypted counterparts, the techniques just described are not limited to any particular kind of executable code or any particular elements of that executable code, but can be used to obfuscate any component of any piece of executable code.

The technique of encrypting the construct in the definition and then matching the encrypted construct with an encrypted construct in the executable code can even be used to execute encrypted executable code without decrypting the encrypted executable code. In this case, every component of the executable code, including operation codes (which are, after all, only special kinds of names) is encrypted. Definitions, whether internal to the code or external to the code, are related to encrypted components as described above. When this technique is used with completely encrypted executable code, the encryption may make obfuscation unnecessary.

Watermarking Executable Code

The following discussion first presents the static techniques for watermarking executable code described in U.S. Ser. No. 10/019,827 and then the dynamic techniques described therein.

Figure 7:
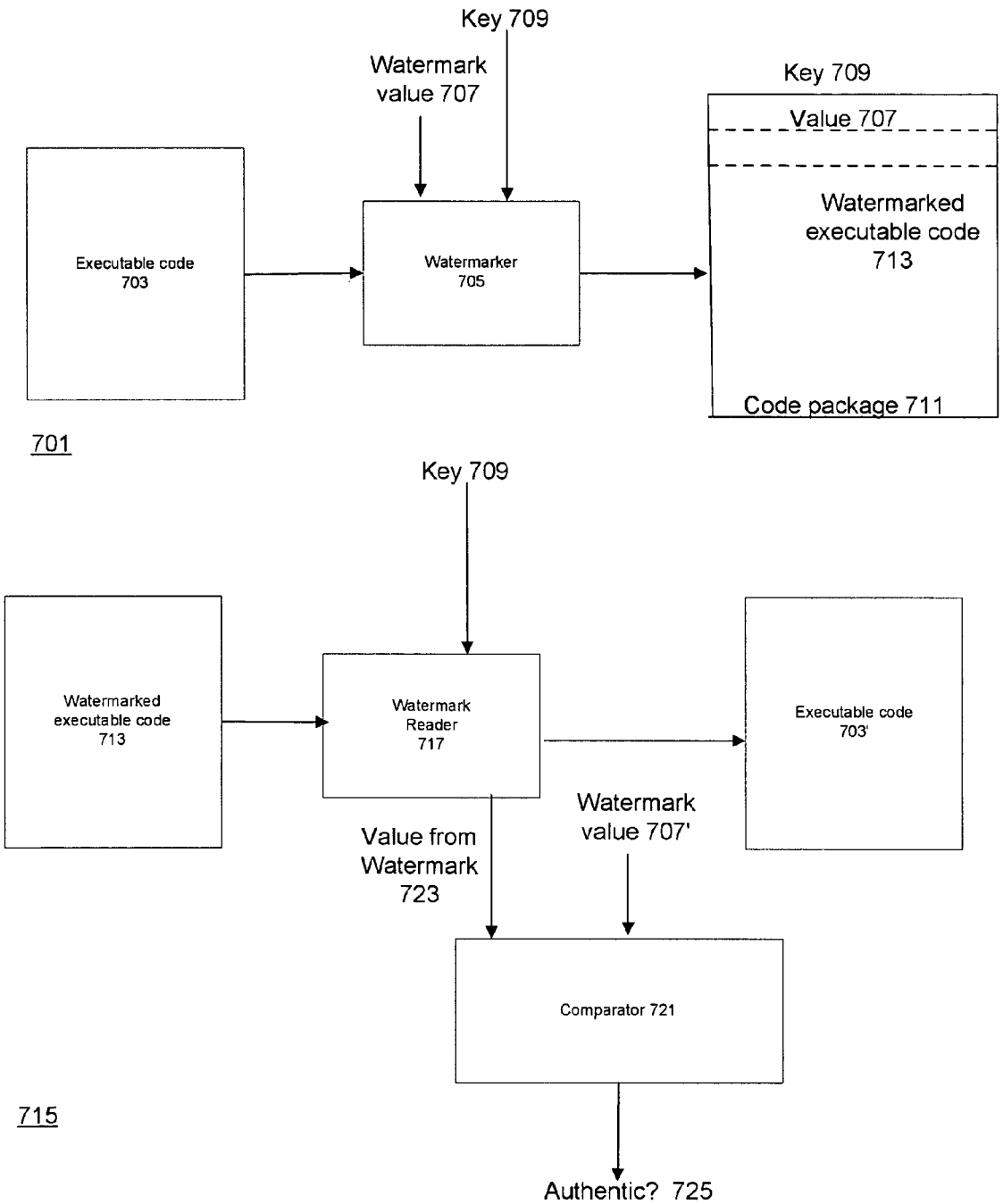
FIG. 7 is a block diagram of watermark creation and watermark reading.
Figure 9:
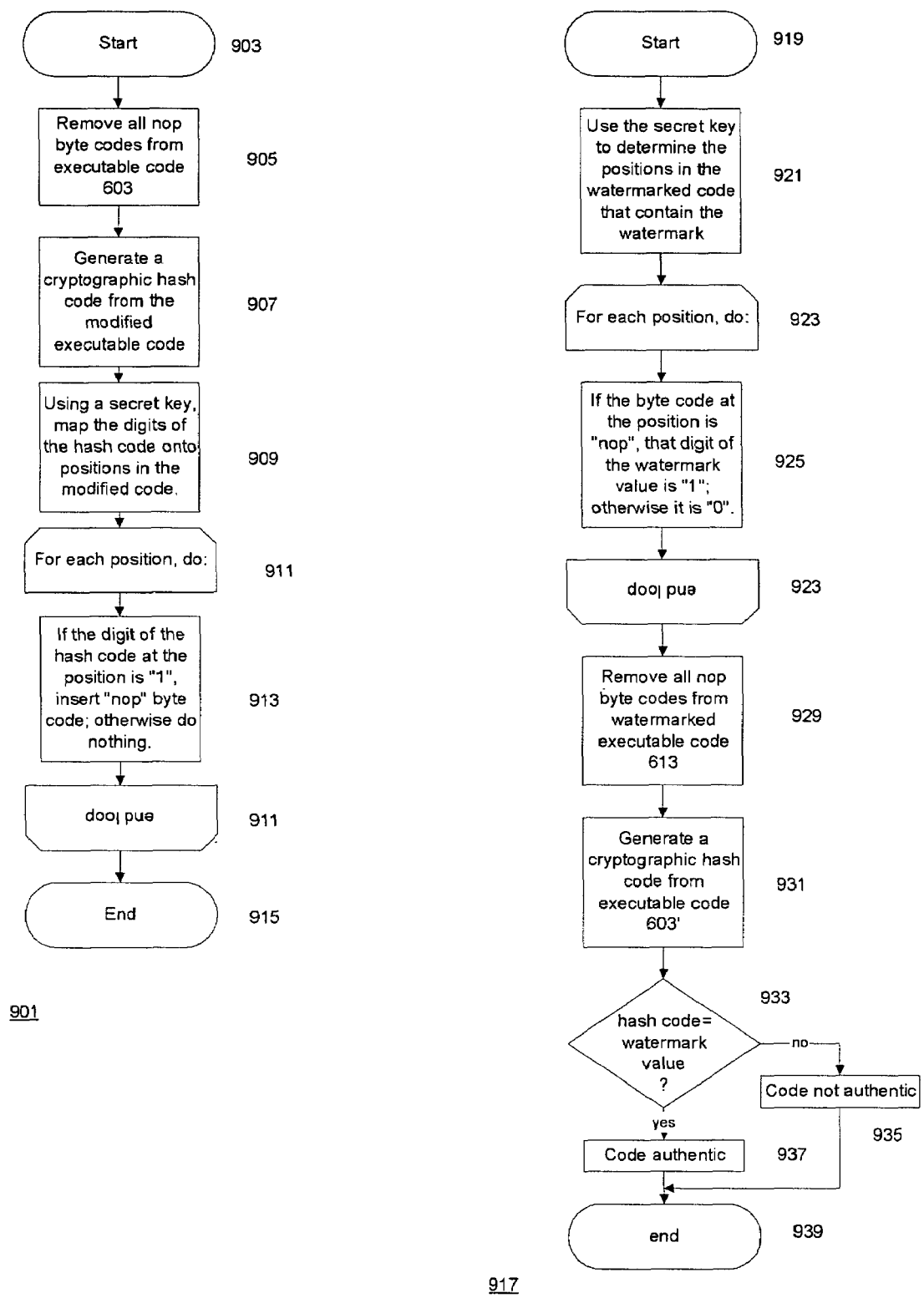
FIG. 9 is flowcharts for adding a watermark to a Java byte code sequence and using the watermark to authenticate the Java byte code.

Static Watermarking by Adding Operations that Do Not Affect Execution of the Executable code: FIGS. 7-9

Techniques for using digital watermarks to authenticate analog documents made from digital representations can be adapted to the static watermarking of executable code. The techniques in question work by making a watermark that contains a value that is based on semantic information that is preserved in the analog document and that is itself readable in the analog document, so that the analog document can be authenticated by comparing the value contained in the watermark with a new value that is based on the semantic information. In executable code, the semantic information contained in the code is the processing which is done when the code is executed. A value to be used in watermarking can be derived from this semantic information in the same way that such a value can be derived from the text of a document. The problem with watermarking executable code is finding a way to add the watermark to the code in such a fashion that two conditions are fulfilled:

the watermark does not change the semantics of the code; and removal of the watermark is detectable.

FIG. 7 is a block diagram that shows in overview how a static watermark that fulfills the above two conditions may be added to executable code and then used to authenticate the executable code. Making and adding the watermark are shown at 701. Executable code 703 is input to watermarker 705 along with a value 707 that is to be contained in the watermark and a key 709 that determines where the watermark will be located in the watermarked code. Watermarker 705 takes executable code 703 and makes the watermark by adding byte codes that do not affect the execution of executable code 703 at locations specified by key 709 in such fashion that the added instructions together with certain of the original instructions represent value 707.

Watermark value 707 and key 709 are required to read the watermark in watermarked executable code 713, and therefore must be available to the system that is doing the reading. One way of making them available is to include them in a code package 711 containing watermarked code 713; where necessary, key 709, value 707, or both may be encrypted so that they can be read only by the system that is doing the reading. Another way of making value 707 available is to employ a value that is computable from unwatermarked executable code, and key 709 may be a key that belongs to the system that is reading the watermarked code. Code package 711 is then sent to the receiving system.

At 715 is shown how watermarked executable code 713 is authenticated in the receiving system. Watermarked executable code 713 from package 71 1and key 709 are input to watermark reader 717, which uses key 709 to locate and interpret the instructions in watermarked executable code 713 that represent watermark value 707. Having located the instructions, watermark reader 717 reads watermark value 623 from them and removes the added instructions from watermarked executable code 713, leaving executable code 703', which is identical with executable code 703. If code package 711 includes watermark value 707, the value is the source of watermark value 707' which is compared with watermark value 623 in comparator 621. If they match, executable code 703 is authentic; if not, it is not. In other embodiments, watermark value 707' may be recomputed from executable code 703. For example, watermark value 707 may be a digest of executable code 703, and watermark value 707' may be obtained by computing a digest of executable code 703' in the same fashion that watermark value 707 was computed from executable code 703.

FIG. 8 shows a printed representation 801 of a sequence of Java byte codes which has been watermarked using the technique described above. Watermarker 705 has added three Java nop byte codes 803(*a..c*) at locations specified by key 709. The Java virtual machine responds to a nop byte code by doing nothing whatever. Addition of the nop byte codes thus does not affect the semantics, that is, the execution of executable code 703. Each nop byte code is a binary digit of watermark value 707. In a preferred embodiment, key 709 specifies the locations of the added nop byte codes and the locations of other byte codes. In a preferred embodiment, the locations with nop byte codes represent the binary value "1", while the locations with other byte codes represent the binary value "0". This could of course be reversed, and key 709 could also specify a value in a different representation of numeric values.

FIG. 9 is flowcharts showing how watermarks are used to authenticate Java byte codes in a preferred environment. Flowchart 901 shows how the watermark is created and inserted into the Java byte codes. Starting at 903, the first step is to remove all nop byte codes from the Java byte code being authenticated (905). Then a cryptographic digest is generated from the modified Java byte code (907). Thereupon, a secret key is used to map the digest onto positions in the modified Java byte code (909). Finally, in loop 911, for each position, if the digit of the digest at the position is "1", insert nop; if it is "0", do nothing.

Flowchart 917 shows how the watermark made in flowchart 901 is read and used to authenticate the watermarked byte code. Starting at 919, the first step is to use the secret key to determine the positions in the byte code that contain the watermark (921). Then in loop 923, each of the indicated positions is examined; if the position contains a nop byte code, the corresponding digit of watermark value 623 is "1"; otherwise, it is "0" (925). Watermark value 623 is of course the digest generated from the byte code after all nop codes have been removed; consequently, in step 929, all nop byte codes are removed from watermarked executable code 613. In step 931, a new digest is generated from the watermarked executable code that has had its nop codes removed; if the new digest matches watermark value 623 (933), the watermarked byte code is authentic (937); otherwise it is not (935).

The technique described above will work not only with the nop byte code, but also with any byte code or sequence of byte codes that does not affect the results of the execution of the byte code. For example, a pair of byte codes which first pop a value off a stack and then pushes the value back on the stack may be used in the same fashion as the nop byte code. The technique is also not limited to Java byte codes, but may be used with any kind of executable code.

Figure 10:
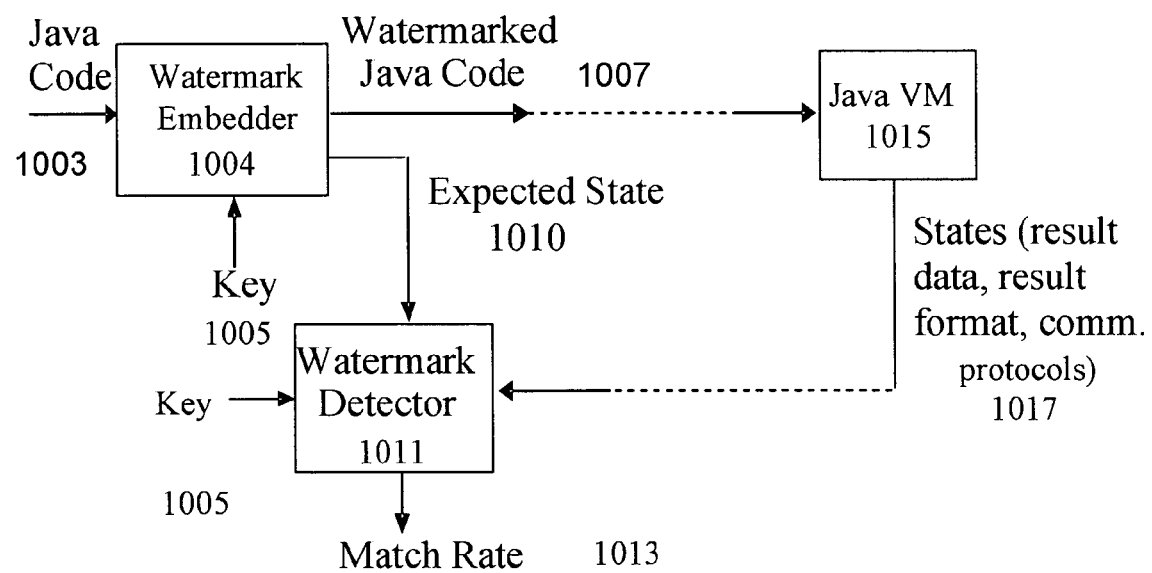
FIG. 10 is a block diagram of apparatus for adding dynamic watermarks to executable code and using the watermark to authenticate the executable code.

Techniques for Dynamic Watermarking: FIG. 10

Dynamic watermarking bf executable code is based on the fact that the execution of a program results in the dynamic production of information. The information produced by the execution defines sequence of states. These states are termed herein execution states. Properties of a program's execution states can be used to identify the program, and thus to authenticate the program. One way of doing this is to make a record of the relevant properties of the execution states during an execution of the authentic program. To determine whether another execution was an execution of the authentic program, one makes a record of the relevant properties of the other execution and compares it with the record made during the execution of the authentic program; if they are the same, the other execution was an execution of the authentic program. The relevant properties may of course include data output by the program.

Execution states can be used to authenticate an execution of mobile code on a receiving system to the system that sent the mobile code, to authenticate the execution to another system that uses outputs from the execution of the mobile code on the receiving system, or to authenticate the execution on the receiving system itself (in this case, the authentication confirms that the received code is authentic). In all of these cases, the mobile code is watermarked by modifying it to produce execution states which can be examined to determine whether the code that was executed was authentic. The execution states that are to be examined must have two characteristics:

any modification of the watermarked code must affect those states and the execution states must be predictable in a given execution environment.

The entity that is to authenticate the execution of the mobile code must have a description of the execution states that are to be examined. The description must specify the states and what their expected values are. The authenticating entity then compares the states resulting from the execution with the description; if they match, the execution is an execution of authentic code. If the description is to be sent to the authenticating entity via a network, it can be protected using the usual encryption techniques.

An instance of a given item of mobile code may have one or more of a large number of different and constantly changing watermarks; thus, although an unauthorized person might make a version of the mobile code that contained one of the watermarks, making versions for all of the watermarks would be impractical.

FIG. 10 is a block diagram of apparatus for dynamically watermarking Java byte codes. Byte codes 1003 are input to watermark embedder 1004 together with a key 1005. Key 1005 determines how byte codes 1003 are modified to produce execution states that can be observed to determine whether the code that was executed was authentic. Watermark embedder 1004 produces as its outputs watermarked byte code 1007 and expected state patterns 1009, which is a description of state patterns that will result from an execution of watermarked Java code 1007. When Java virtual machine 1015 executes watermarked Java code 1007, the result is a sequence of execution states. Those states 1017 that are relevant for determining the authenticity of the executed code are returned to watermark detector 1011. The other inputs for watermark detector 1011 are the key 1005 used to make watermarked Java code 1007 and the expected state patterns 1009. Key 1005 determines which of the state patterns in expected state patterns 1009 and returned states 1017 are to be examined, and watermark detector 1011 compares those state patterns in 1009 and 1017. If the match is close enough, the executed code was authentic. When apparatus 1001 is used with mobile code, watermark detector 1011 will be located at the authenticating entity, be it the sending system, the receiving system, or a third system which receives outputs from the mobile code.

Kinds of Execution States that may be used for Dynamic Watermarking

While any execution states that satisfy the criteria mentioned above may be used in dynamic watermarking, two types of execution state have been found to be particularly useful:

- execution state that, when the executed code is authentic, satisfies a protocol defined between the entity that is authenticating the execution and the entity that is performing the execution; and
- execution state that gives an execution trace of the executed code a particular form when the executed code is authentic.

Both of these types will be explained in more detail in the following.

Execution State that Satisfies a Protocol

This kind of execution state is particularly useful when the execution of the code that is being authenticated outputs data to the entity that is doing the authentication. In this approach, the effect of watermarking the code is to alter the manner in which the data is output to the authenticating entity. Among the ways in which the watermark can affect the manner in which the data is output are the following:

- causing the watermarked code to output data in a particular order when the code is executed;
- causing the watermarked code to output particular redundant data along with the data required for the program's proper functioning;
- causing the watermarked code to output data having particular data types; and
- causing the watermarked code to output data that obeys particular constraints.

The watermarker can change one or more of these properties of the output, and can do so differently for each instance of the executable code that is sent from the sender to a recipient.

To give a simple example, the output from the execution of a Java byte code may be treated as an object of the built-in Java class Vector. Objects of this class contain one or more other objects. Each contained object is an element of the Vector object and is referenced by element number. The semantics of the executable program being watermarked requires that the program's output contain certain data; if that data is present and locatable in the Vector object output by the watermarked executable code, the elements of the Vector object may be ordered in any manner and may include any number of elements in addition to the data required by the executable program's semantics. In addition, the additional elements may have varying types and may obey varying constraints relative to each other. For instance, some of the additional elements may be time stamps and the constraints may be that the time stamps satisfy certain temporal conditions relative to an absolute time or to each other.

A watermarker such as watermark embedder 1004 receives the byte code to be watermarked and the key as inputs. The key specifies a unique variation of the Vector object output by the executing program and the watermarker responds to the key by modifying the byte code so that it will output a Vector object of the kind specified by the key. The watermarker then sends the key and a description of the variation of the Vector object that the key specifies to the entity that is to authenticate the code being executed. In some embodiments, it may be possible to determine the variation from the key alone, and in that case, only the key need be sent to the entity that is to authenticate the execution of the code.

In the entity that is to authenticate the code being executed, a watermark reader such as watermark detector 1011 receives the Vector object output by the code being executed and uses the key and the description of the variation of the vector object that the watermarked code is to output to determine what elements of that object are relevant for the authentication check and the properties those elements must have if the code being executed is authentic. For instance, the key and description may specify that the $9^{th}$ and $21^{st}$ elements of the Vector object contain time stamps and that the timestamp in the $9^{th}$ element is 2 seconds later than the timestamp in the $21^{st}$ element. If the specified elements are not time stamps, or if they do not satisfy the specified constraint, the code being executed is not authentic.

Figure 12:
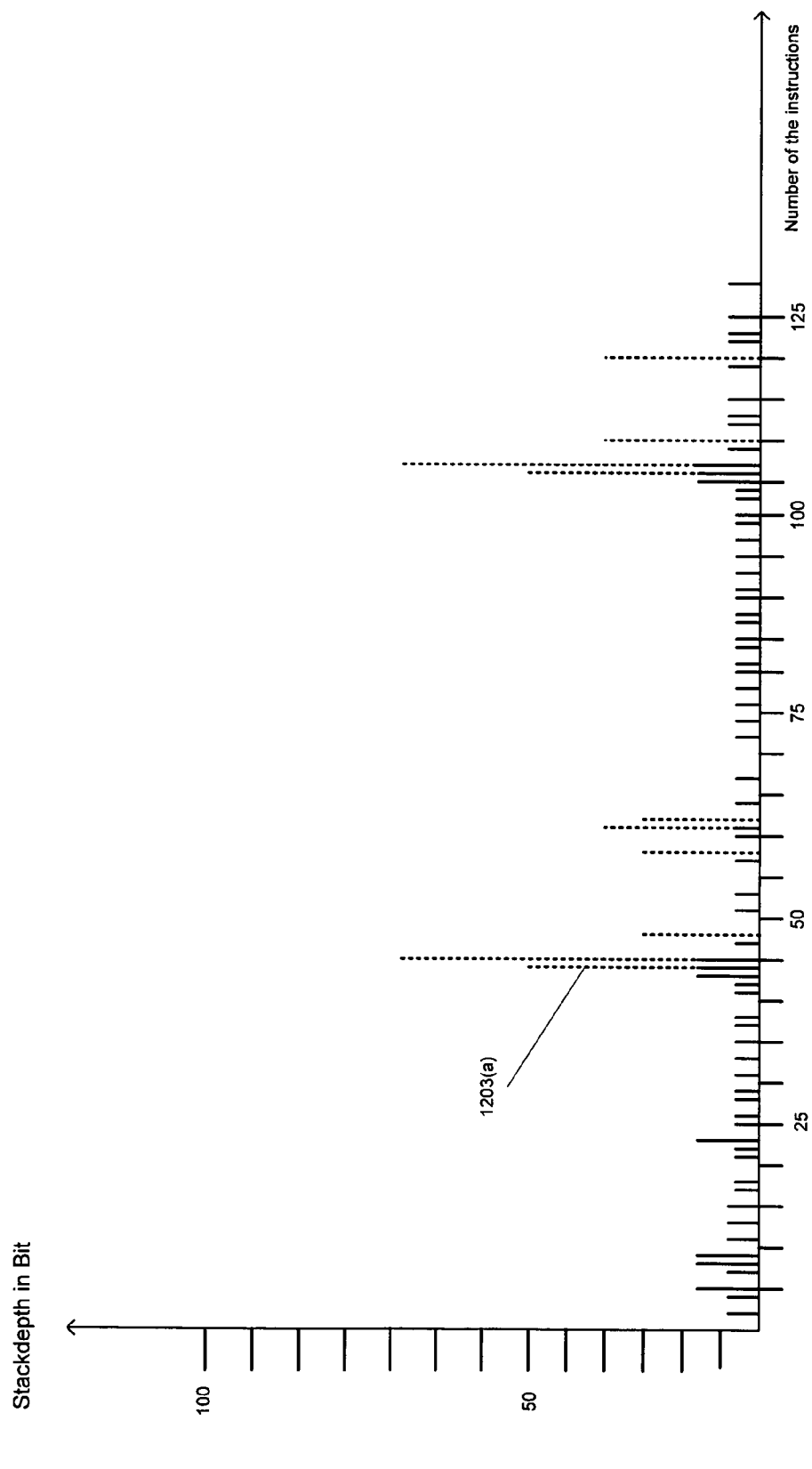
FIG. 12 is a display for a stack depth monitor showing the stack depth during the execution of FIG. 11.

Execution State that gives an Execution Trace a Particular Form: FIGS. 11 and 12

A problem with watermarking executable code by modifying it so that it varies its outputs is that there are many situations where the outputs produced by the executable code are completely specified by a standard and no variation is possible. In such situations, the modifications of the executable code produced by the watermark can only be permitted to affect the internal execution state of the program. Various techniques are available for obtaining information about the internal execution state of a program. One such technique is shown in FIGS. 10 and 11.

FIG. 11 shows an execution trace 1101 of a portion of the execution of a Java byte code. Execution trace 1101 shows the order in which the byte codes were actually executed together with additional information about each of the byte codes. FIG. 12 is a stack monitor 1201 that shows how the depth of the stack maintained by the Java virtual machine varied during the execution traced by execution trace 1101. The numbers along the x axis of the graph of FIG. 12 correspond to the instruction numbers at the left of FIG. 11; the numbers along the y axis specify the depth of the stack in bytes. A vertical line associated with each instruction number shows the depth of the stack when that instruction was executed. Thus, the peak in stack depth labeled 1203(*a*) corresponds to the invocation at instruction 41 in FIG. 11.

A watermarker can be made to modify executable code in such a fashion that the modifications will affect the depth of the stack during program execution. With such a watermarker, modification of the executable code using a particular key produces a graph of stack depth versus executed instruction number that is uniquely associated with the key and the executable code that was watermarked using the key. Thus, the watermarker can watermark the executable code and then execute it to produce the stack depth graph. The stack depth graph becomes the execution state pattern for the watermarked code and is provided along with the key to the authenticating entity's watermark detector. When the watermarked executable code is executed in the receiving system, that system produces a stack depth graph for that execution and provides the stack depth graph to the authenticating entity. The authenticating entity then compares the stack depth graph made at the time of watermarking to the stack depth graph make when the watermarked program is executed in the receiving system. If they are sufficiently similar, the program is authentic.

Of course, things other than the watermark will influence the stack depths reached at various points in a program's execution and thus the execution's stack depth graph. Stack depth graphs from various executions of a program can be made comparable by treating the stack depth graph as a representation of a digital signal, with the depth of the stack being the signal's energy. When this is done, various signal modulation and spread spectrum techniques may be employed to model the behavior of the watermarked program's stack depth graph over many executions. The model may then be uniquely associated with the key used to watermark the program and alterations of the watermarked program may be detected by using the model to analyze the stack depth graphs produced by the watermarked program. By applying the model to a stack depth graph, it is even possible to detect where and to what extent the watermarked program has been altered.

Multi-Layer Protection of Mobile Code

Figure 14:
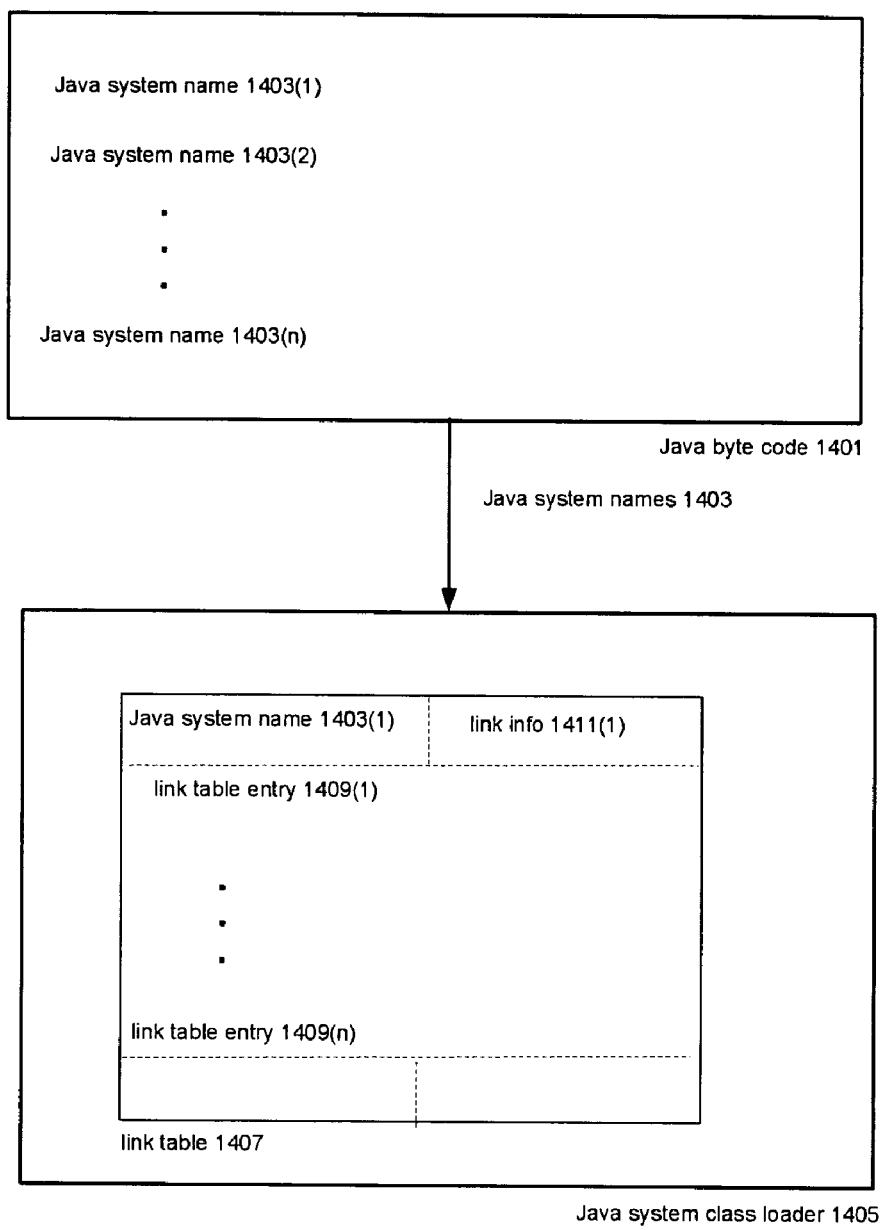
FIG. 14 is a block diagram of a prior art unextended Java system class loader.

Class Loaders with Class Evolution: FIGS. 14 and 6

As already mentioned with regard to obfuscation, the Java virtual machine 115 provides class loaders for the names referred to in Java byte code. The function of a class loader is to resolve names in Java byte code by linking the names to their definitions. With names defined in the application byte code, the virtual machine uses the application byte code to make the class loader; with Java system names, Java virtual machine 115 includes a built-in system class loader. FIG. 14 shows such a system class loader 1405. Java byte code 1401 contains a number of Java system names 1403. System class loader 1405 contains a link table 1407 which has an entry 1409 for each Java system name. The entry relates the system name to link information 1411 which the Java virtual machine can use to reach the name's definition. Class loaders, including the system class loader, are themselves Java classes; consequently, a Java programmer may extend a class loader by adding definitions of methods and other names to it. A standard use of this capability is instrumenting the class that is loaded by the class loader. For details on Java class loaders and how they may be extended, see the paper, Sheng Liang and Gilad Bracha, *Dynamic class loading in the Java Virtual Machine*, which appeared in OOPSLA '98, Vancouver BC, Canada, October 1998, and which is hereby incorporated by reference into the present patent application.

As also already set forth in the discussion of FIG. 6 above, extended system class loaders may be used to make obfuscation of Java system names possible. Obfuscated byte code 603 contains an encrypted rename table 615 made with an encryption key 610 in which the obfuscated Java system names have been related to encrypted versions of the unobfuscated Java system names. The system class loader is then extended to use encrypted rename table 615 in the linking process, either by using a decryption key 614 to decrypt the rename table and thus being able to receive obfuscated Java system names from the byte code and map them to the unobfuscated system names (class loader 619) or by encrypting the Java system names which it loads, with encryption key 609, mapping the encrypted Java system names to the unencrypted Java system names, receiving the encrypted Java system names from obfuscated byte code 603, and using the mapping to obtain the unencrypted Java system name corresponding to a given encrypted Java system name (class loader 626)

Class loaders 619 and 626 are examples of system class loaders that do what will be termed in the following class evolution. The system class loader has been extended to change the definition of the class at runtime. With both loader 619 and 626, the system class loader has been extended to map obfuscated Java system names to the corresponding unobfuscated Java system names, and thereby to effectively replace the unobfuscated Java system names with their obfuscated equivalents. In the case of class loader 619, the loader uses the decrypted rename table to do this directly; in the case of class loader 626, the loader does the mapping by way of the encrypted Java system names that it receives from the obfuscated byte code. In the cases of loaders 619 and 626, what has changed is the Java system names; however, as is apparent from the use of class extension for instrumentation, the system class loader may also be extended to add methods to the class at runtime. As will be explained in detail later, among the functions which may be performed by these added methods are static and dynamic authentication of the byte code.

Figure 13:
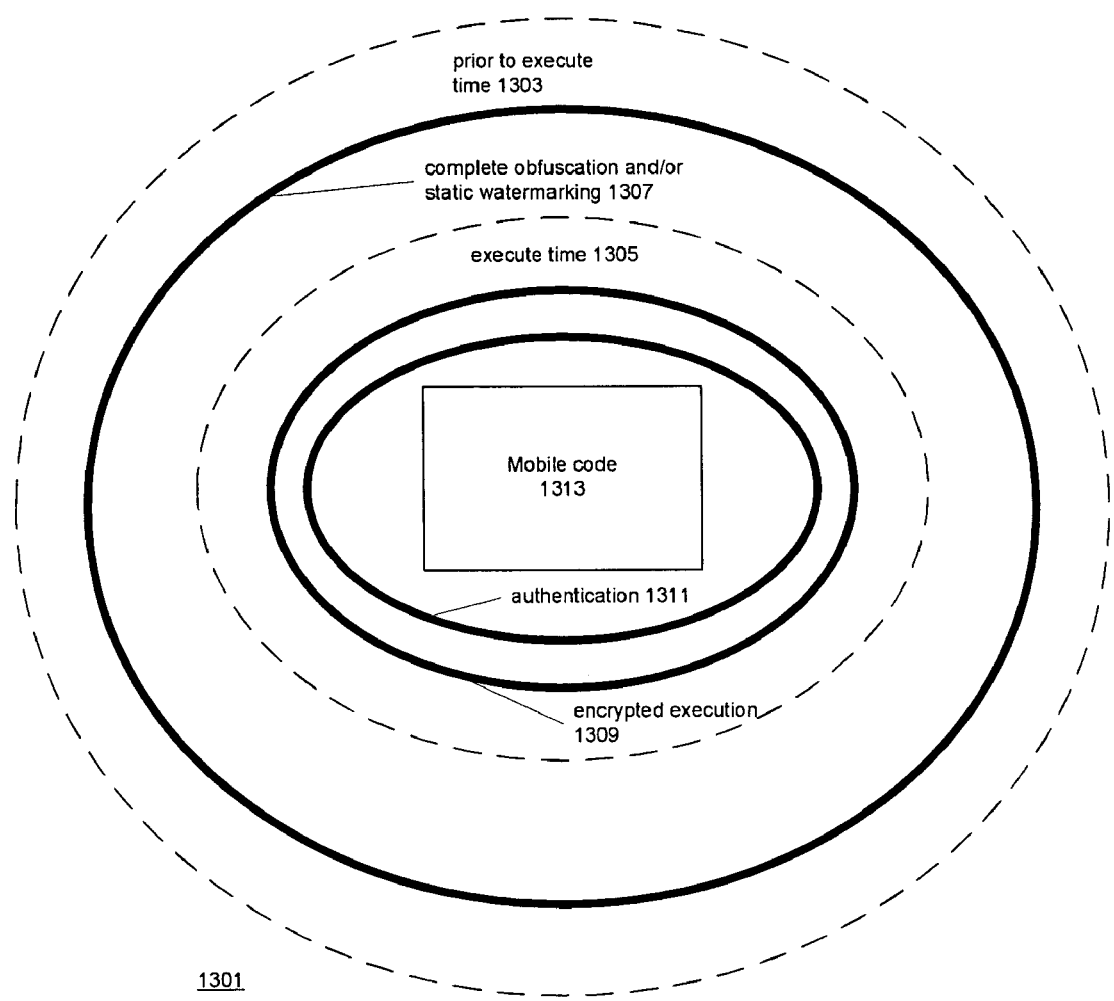
FIG. 13 is a diagram of a layered protection arrangement for mobile code.

Using Class Evolution to Provide Multi-Layered Protection for Mobile Code: FIG. 13

FIG. 13 provides an overview of a multi-layered protection scheme 1301 for mobile code 1313. The protection is added to mobile code 1313 at two times: before execution 1307, when the source code is written or as part of the compilation process, and during execution 1305, when the executable code is executed. In the case of mobile code written in Java, the executable code consists of the Java byte codes.

The first layer of protection 1307 is added before execution. The first layer may include static watermarking of the executable code as explained above and may also include complete obfuscation of all of the names in the executable code. The complete obfuscation is done using the obfuscation techniques described above.

The second and third layers of protection 1309 and 1311 are added during execution by an extended system class loader that does class evolution. Layer 1309 is the encrypted execution of objects referred to by Java system names; as explained above, a table in mobile code 1313 maps obfuscated Java system names to encrypted version of the unobfuscated Java system names and the extended class loader applies the key used to encrypt the unobfuscated system names to the unobfuscated system names known to the extended class loader to produce a mapping from the encrypted Java system names to the unobfuscated Java system names and uses the mapping to link the obfuscated Java system names in mobile code 1313 to their corresponding unobfuscated Java system names and thus make it possible to link the obfuscated Java system names to the definitions of the objects represented by the unobfuscated Java system names.

Layer 1311 is authentication of mobile code 1313 using watermarks. The authentication may either be done using the static watermark added in layer 1307 or it may be done by causing the execution of mobile code 1313 to produce a dynamic watermark. Any of the techniques described above may be used to produce the dynamic watermark. The extended system class loader includes methods that do the authentication and that are added to mobile code 1313 when mobile code 1313 is executed. These methods are stored in the extended class loader in encrypted form and are decrypted by the class loader when they are added to mobile code 1313.

Figure 16:
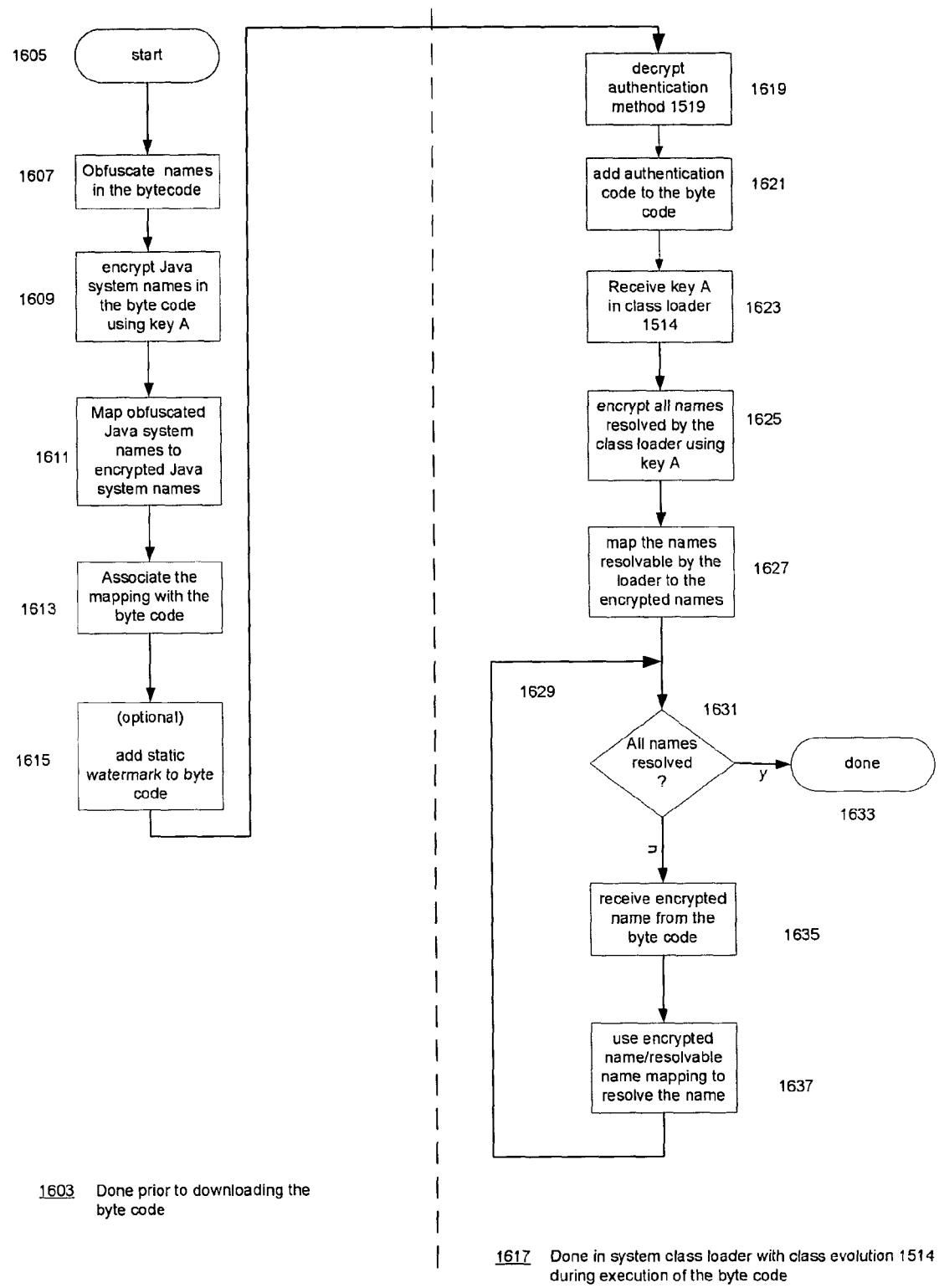
FIG. 16 is a flowchart of a method for applying the layered protection arrangement of FIG. 13 to Java byte code.

Applying the Layers to Mobile Code 1313: FIG. 16

FIG. 16 is a flowchart 1601 showing how layers 1307, 1309, and 1311 may be applied to Java byte code. As shown at 1603, steps 1605-1615 are performed prior to downloading the byte code to the location where it will be executed; as shown at 1617, the remaining steps 1619-1637 are performed in an extended system class loader that has the class evolution features described above.

Beginning at start 1605, all of the names in the byte code are obfuscated (1607). Then the unobfuscated Java system names are encrypted using a key A (1609). This done, the obfuscated Java system names are mapped to the encrypted Java system names (1611). Then the mapping is associated with the byte code (1613). Thereupon, a static watermark may be added to the byte code (1615). All of this is done prior to downloading the byte code, generally, but not necessarily, as part of the compilation process that produces the byte code.

When the byte code is received in the system that is to execute it and execution begins, the extended system class loader first decrypts the authentication method (1620) and adds the necessary byte codes to execute the method to the downloaded byte code (1621). Then the extended system class loader receives key A (1623) and uses it to encrypt all of the Java system names resolved by the system class loader. The class loader then maps the encrypted names to the unencrypted Java system names (1627). At this point, the extended system class loader can begin resolving names. As shown by decision block 1631 and loop 1629, it does so until all names have been resolved. For each obfuscated Java system name, it uses a mapping between the obfuscated Java system name and the encrypted Java system name in the byte code to obtain the encrypted Java system name corresponding to the obfuscated Java system name (1635) and then uses the mapping between the encrypted name and the unobfuscated Java system name in the extended system class loader to resolve the obfuscated Java system name (1637).

Figure 15:
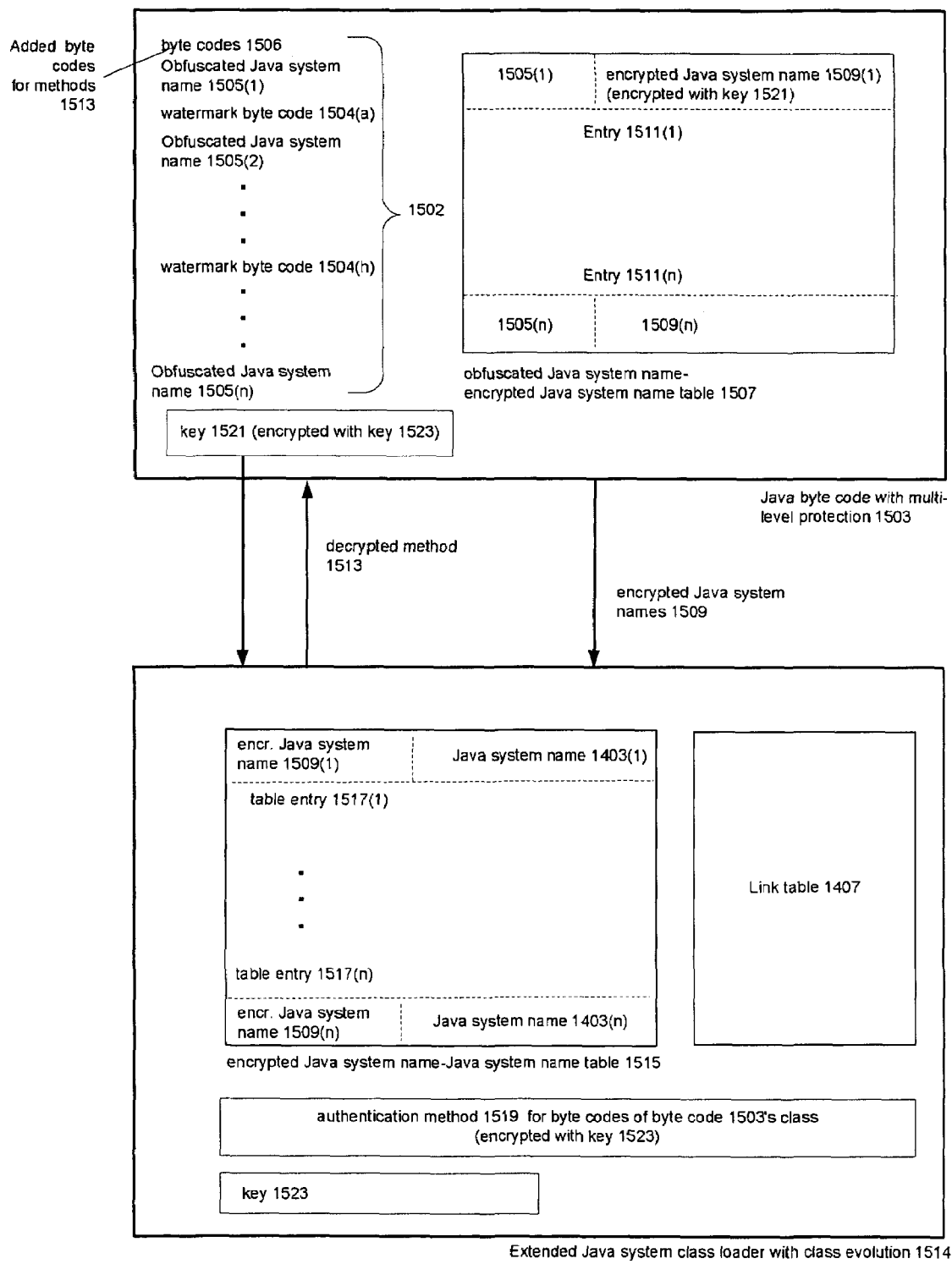
FIG. 15 is a block diagram of Java byte code and an extended Java system class loader in which the protection arrangement of FIG. 13 have been implemented.

An Example of Multi-Layer Protection of Java Byte Code: FIG. 15

FIG. 15 gives an example 1501 of Java byte code with multi-level protection 1503 and of an extended Java system class loader with class evolution 1514 that works with the protection features of byte code 1503. Byte codes 1502 include in byte code 1503 when it is downloaded include obfuscated application-defined names (not shown), completely obfuscated Java system names 1504, and watermark byte codes 1504 which are inserted in byte codes 1502 to provide a watermark as described above. In the example, the watermark's value is a digest made from the byte codes prior to the addition of the static byte watermark. A key 1523 which is available to extended class loader 1514 specifies the locations of the watermark byte codes in byte codes 1502. The mapping between the obfuscated Java system names 1505 and the encrypted unobfuscated Java system names is done by table 1507; each entry 1511 in the table contains an obfuscated Java system name and the encrypted corresponding unobfuscated Java system name. The encrypted Java system names are encrypted by key 1521, which has been encrypted by key 1523 and included in byte code 1503. Also in byte code 1503 is a digest made from byte codes 1502 as downloaded. The digest is encrypted by key 1521.

At the beginning of execution of byte code 1503, class loader 1514 uses key 1523 to decrypt authentication methods 1519 for byte codes belonging to byte code 1503's class and then adds the byte codes 1506 necessary to invoke the authentication methods to protected byte codes 1503. The byte codes must be added in such a way that they do not disturb the information in byte code 1503 on which the authentication depends. Then the extended system class loader uses key 1523 to decrypt key 1521 and uses key 1521 to make table 1515, which maps encrypted Java system names 1509 to their corresponding unobfuscated Java system names. Each entry 1517 contains an encrypted Java system name 1509(*i*) and its corresponding unobfuscated Java system name 1403. Table 1507, table 1515, and link table 1407 thus together make it possible for class loader 1405 to resolve an obfuscated Java system name 1505(*i*) to the linking information 1411(*i*) for the Java system name 1401(*i*) corresponding to obfuscated system name 1505(*i*).

Once table 1515 has been set up, the Java virtual machine can begin executing byte codes 1503 as modified by extended system class loader 1514. As extended Java system class loader receives each obfuscated Java system name, it uses tables 1507, 1515, and 1407 to resolve the name. When the virtual machine executes byte codes 1506 which result in the execution of an authentication method 1519, the method is executed. The example authentication method 1519 uses the static watermark to produce a dynamic watermark. Authentication method 1519 first uses key 1523 to determine which byte codes in byte codes 1502 are watermark byte codes 1506 and then determines the digest value contained in the watermark from the particular byte codes in the positions specified by key 1523 for the watermark. Next, it removes the byte codes that were added to byte codes 1502 to make the watermark value. That done, method 1519 computes the digest of byte codes 1502 with the watermark byte codes removed and compares the result with the digest value contained in the watermark. If they are the same, the byte codes 1502 have not changed. If they are different, method 1519 performs an action such as notifying an authenticating entity that byte code 1502 has been altered or causing the execution of byte codes 1502 to cease.

Some important characteristics of the arrangements shown in FIG. 1501 are the fact that the resolution of the obfuscated Java system names is done via the encrypted Java system names, so that there is nowhere in arrangements 1501 a decryption step to produce a direct mapping of obfuscated Java system names to unobfuscated Java system names and the fact that the obfuscated system symbolic names and the authentication methods remain encrypted until they are loaded into a Java virtual machine. Of course, the static watermark's contents may be a value other than the digest, the authentication method may use the static watermark's contents in different ways, and any dynamic watermarking technique may be employed, including any of those described in the parents of the present application.

Many arrangements for keys other than those shown in FIG. 15 are possible. The arrangement shown is particularly advantageous when the byte codes are being downloaded to a particular device such as a cell phone or a set-top box whose key 1523 is known to the source of the byte codes. Another approach would be to encrypt digest 1512 with key 1523, have the second authentication method decrypt the digest 1523 and inform the source whether the code is authentic as described above, and have the source provide key 1521 only when the code is authentic.

CONCLUSION

The foregoing Detailed Description has disclosed to those familiar with the relevant technologies how multi-layer protection may be added to mobile code and has described the best mode presently known to the inventors of adding such protection. While the techniques used to obtain the multi-layer protection are presented in the context of the Java programming and execution environments, the techniques can be used in any execution environment which permits redefinition of a class on execution of a program that uses the class or even in execution environments which have built-in arrangements for resolving obfuscated system symbolic names or adding a method to a program. It will further be apparent to those familiar with the relevant technologies that how the names are obfuscated is not critical to the techniques disclosed herein. The same is true with regard to the way in which the added method determines the authenticity of the program or with regard to the way that information is encrypted or the way the keys are handled. For all of these reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. An improved class loader belonging to a program execution environment, the program execution environment being stored in a storage medium accessible to a host computer system, the improved class loader loading classes belonging to programs which the host computer system executes using the program execution environment, and the improved class loader being characterized in that:
   the improved class loader includes a component which the host computer system employs when using the program execution environment to execute a program that specifies entities defined by a class loaded by the improved class loader, the component extending the class by adding a method to the program which, when executed by the host computer system in the execution environment, determines whether the program has been modified by the host computer system, the added method being encrypted in the class loader and the host computer system decrypting the added method when the host computer system adds the added method to the program.

2. The improved class loader set forth in claim 1 further characterized in that:
   the program execution environment resolves symbolic names defined by the class; and
   the component extends the class by modifying name resolution to permit replacement of symbolic names in the program that identify entities defined by the class by corresponding obfuscated symbolic names.

3. The improved class loader set forth in claim 1 further characterized in that:
   the program includes a first association between obfuscated symbolic names in the program and encrypted forms of the corresponding symbolic names; and
   the component extends the class by adding a second association between the encrypted forms and information used to resolve the symbolic names defined in the class, the program execution environment using the first and second associations to resolve the obfuscated symbolic names.

4. The improved class loader set forth in claim 1 further characterized in that:
   the component employs encrypted information to extend the class.

5. An improved class loader belonging to a program execution environment, the program execution being stored in a storage medium accessible to a host computer system, the improved class loader loading classes belonging to programs which the host computer system executes using the program execution environment, and the programs including an encrypted component that contains information usable by the class loader to resolve symbolic names used in the program to specify entities defined in the class and the improved class loader being characterized in that:
   the improved class loader includes a component which the host computer system employs when using the program execution environment to execute a program having the encrypted component, the improved class loader's component using information from the program's encrypted component to resolve the symbolic names.

6. The improved class loader set forth in claim 5 further characterized in that:
   the encrypted component includes encrypted forms of the symbolic names; and
   the component of the class loader specifies an association between the encrypted forms and information used by the class loader to resolve the symbolic names.

7. The improved class loader set forth in claim 6 further characterized in that:
   the program specifies an association between obfuscated names corresponding to the symbolic names and the encrypted forms.

8. The improved class loader set forth in 5 further characterized in that:
   the class loader employs a key in connection with the encrypted component.

9. The improved class loader set forth in claim 8 further characterized in that:
   the class loader employs the key to resolve the names.

10. The improved class loader set forth in claim 8 further characterized in that;
    the class is downloaded to the host for execution from a remote source.

11. The improved class loader set forth in claim 5 further characterized in that:
    the class is downloaded to the host for execution from a remote source.

12. A method of protecting a program that is executed in a host computer system from the host computer system, the program being executed in a program execution environment that is stored on a storage medium accessible to the host computer system and includes a class loader that loads a class used by the program, and the method being characterized by the steps performed when the host computer uses the program execution environment to execute the program of:
    prior to execution of the program, using the class loader to provide an encrypted method which determines whether the program has been modified by the host and to decrypt the method ; and
    when the program is executed, using the decrypted method to determine whether the program has been modified by the host.

13. The method set forth in claim 12 further characterized in that:
    the program execution environment performs name resolution of symbolic names in the program; and
    the symbolic names include obfuscated symbolic names corresponding to symbolic names defined in the class; and
    the decrypted method modifies name resolution to resolve the obfuscated symbolic names.

14. The method set forth in claim 13 further characterized in that:
    the program includes a first association between the obfuscated symbolic names and encrypted forms of the corresponding symbolic names; and
    the step of using the class loader to provide the decrypted method includes the step of making a second association between the encrypted forms and information used to resolve the corresponding symbolic names; and the decrypted method uses the first and second associations to resolve the obfuscated names.

15. A program execution environment that is stored in a storage medium accessible to a host computer system, the host computer system using the program execution environment to execute code, the program execution environment resolving symbolic names in the code, the symbolic names including system symbolic names defined in the execution environment, and the program execution environment being characterized in that:

the code executed by the program execution environment comprises one or more obfuscated symbolic names that correspond to system symbolic names; and an association between the obfuscated names and encrypted forms of the corresponding system symbolic names; and the execution environment uses information from the association to resolve the obfuscated symbolic names.

16. The code set forth in claim 15 wherein:

the execution environment includes a further association of the encrypted forms with information needed to resolve the corresponding system symbolic names and uses the association and the further association to resolve the obfuscated symbolic names.

17. The code set forth in claim 16 further comprising:

authentication information from which authenticity of the code may be determined at runtime, the execution environment further using the authentication information to determine authenticity of the code.

* * * * *

UNITED STATES PATENT AND TRADEMARK OFFICE
CERTIFICATE OF CORRECTION

| | |
|---|---|
| PATENT NO. | : 7,421,586 B2 |
| APPLICATION NO. | : 10/654826 |
| DATED | : September 2, 2008 |
| INVENTOR(S) | : Chenghui Luo and Jian Zhao |

It is certified that error appears in the above-identified patent and that said Letters Patent is hereby corrected as shown below:

Column 1, line 35, the following should be inserted before the section "BACKGROUND OF THE INVENTION":

--STATEMENT REGARDING FEDERALLY SPONSORED RESEARCH

This invention was made with Government support under Agreement F30602-01-2-0505 awarded by the Air Force. The Government has certain rights in this invention.--

Signed and Sealed this

Seventeenth Day of November, 2009

David J. Kappos
*Director of the United States Patent and Trademark Office*